US012810117B2

(12) United States Patent
Sestini et al.

(10) Patent No.: US 12,810,117 B2
(45) Date of Patent: Nov. 24, 2026

(54) GENERATING PERSONAS WITH MULTI-MODAL ADVERSARIAL IMITATION LEARNING

(71) Applicant: Electronic Arts Inc., Redwood City, CA (US)

(72) Inventors: Alessandro Sestini, Stockholm (SE); Linus Gisslén, Stockholm (SE); William Ahlberg, Stockholm (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 586 days.

(21) Appl. No.: 18/447,838

(22) Filed: Aug. 10, 2023

(65) Prior Publication Data

US 2025/0053779 A1 Feb. 13, 2025

(51) Int. Cl.
*G06N 3/045* (2023.01)
*G06N 3/094* (2023.01)

(52) U.S. Cl.
CPC ............ *G06N 3/045* (2023.01); *G06N 3/094* (2023.01)

(58) Field of Classification Search
CPC ............................... G06N 3/045; G06N 3/094
USPC ............................................................ 706/25
See application file for complete search history.

(56) References Cited

U.S. PATENT DOCUMENTS

2019/0236455 A1* 8/2019 Taylor .................... G06N 3/084
2022/0366247 A1* 11/2022 Hamrick ................ G06N 3/092

OTHER PUBLICATIONS

Mnih Volodymyr et al., "Playing Atari with Deep Reinforcement Learning," arXiv preprint arXiv:1312.5602, dated Dec 19, 2013.
Berner, Christopher et al., "Dota 2 with Large Scale Deep Reinforcement Learning," arXiv preprint arXiv:1912.06680, dated Dec 13, 2019.
Stahlke, Samantha et al., "Artificial Playfulness: A Tool for Automated Agent-Based Playtesting," in CHI Conference on Human Factors in Computing Systems, dated May 4, 2019.
Cho, Chang-Sik et al., "Online Game Testing Using Scenario-based Control of Massive Virtual Users," in International Conference on Advanced Communication Technology (ICACT), dated Feb. 7, 2010.
Sestini, Alessandro et al., "Automated Gameplay Testing and Validation with Curiosity-Conditioned Proximal Trajectories," IEEE Transactions on Games, dated Feb. 21, 2022.
(Continued)

*Primary Examiner* — Jeffery A Williams
(74) *Attorney, Agent, or Firm* — Gray Ice Higdon

(57) ABSTRACT

This specification described systems, methods, and apparatus for policy models for selecting an action in a game environment based on persona data, as well as the use of said models. According to one aspect of this specification, there is described a computer implemented method of controlling an agent in an environment, the method comprising: for a plurality of timesteps in a sequence of timesteps: inputting, into a machine-learned policy model, input data comprising a current state of the environment and an auxiliary input, the auxiliary input indicating a target action style for the agent; processing, by the machine-learned policy model, the input data to select an action for a current timestep; performing, by the agent in the environment, the selected action; and determining, subsequent to the selected action being performed, an update to the current state of the environment.

20 Claims, 6 Drawing Sheets

(56) References Cited

OTHER PUBLICATIONS

Gordillo, Camilo et al., "Improving Playtesting Coverage via Curiosity Driven Reinforcement Learning Agents," in Conference on Games (CoG), dated Jun. 23, 2021.
Dulac-Arnold, Gabriel et al., "Challenges of Real-World Reinforcement Learning: definitions, benchmarks and analysis," Machine Learning, vol. 110, No. 9, pp. 2419-2468, dated Apr. 22, 2021.
Politowski, Cristiano, et al., "Towards Automated Video Game Testing: Still a Long Way to Go," arXiv preprint arXiv:2202.12777, dated Mar. 10, 2022.
Aytemiz, Batu et al., "Acting with Style: Towards Designer-Centred Reinforcement Learning for the Videogames Industry," in CHI Workshop on Reinforcement Learning for Humans, Computer, and Interaction (RL4HCI), dated May 8, 2021.
Sestini, Alessandro et al., "Towards Informed Design and Validation Assistance in Computer Games Using Imitation Learning," in NeurIPS workshop on Human in the Loop Learning, dated Aug. 19, 2022.
Silver, David et al., "Mastering Chess and Shogi by Self-Play with a General Reinforcement Learning Algorithm," arXiv preprint arXiv:1712.01815, dated Dec 5, 2017.
Mugrai, Luvneesh et al., "Automated Playtesting of Matching Tile Games," in Conference on Games (CoG), dated Jul. 15, 2019.
Gudmundsson, Stefan Freyr et al., "Human-Like Playtesting with Deep Learning," in Conference on Computational Intelligence and Games (CIG), dated 2018.
Bergdahl, Joakim et al., "Augmenting Automated Game Testing with Deep Reinforcement Learning," in Conference on Games (CoG), dated Mar. 29, 2021.
Zheng, Yan et al., WUJI: Automatic Online Combat Game Testing Using Revolutionary Deep Reinforcement Learning, in International Conference on Automated Software Engineering (ASE), dated Nov. 2019.
Holmgard, Christoffer et al., "Automated Playtesting with Procedural Personas through MCTS with Evolved Heuristics," IEEE Transactions on Games, vol. 11, No. 4, pp. 352-362, dated Feb. 19, 2018.
Pelletier, Pierre Le et al., "Automated Play-testing Through RL Based Human-Like Play-Styles Generation," Conference on Artificial Intelligence and Interactive Digital Entertainment, dated 2022.
Pelletier, Pierre Le et al., "Configurable Agent with Reward as Input: A Play-Style Continuum Generation," in Conference on Games (CoG), dated Nov. 29, 2022.
Amodei, Dario et al., "Concrete Problems in AI Safety," arXiv preprint arXiv:1606.06565, dated Jul. 25, 2016.
Bain, Michael et al., "A Framework for Behavioural Cloning." In Machine Intelligence 15, 1995, pp. 103-112, dated Jul. 30, 2001.
Ross, Stephane et al., "A Reduction of Imitation Learning and Structured Prediction to No-Regret Online Learning," in in international conference on artificial intelligence and statistics, dated Mar. 16, 2011.
Ho, Jonathan et al., "Generative Adversarial Imitation Learning," Advances in neural information processing systems, vol. 29, dated Jun. 10, 2016.
Goodfellow, Ian et al., "Generative Adversarial Networks," Communications of the ACM, vol. 63, No. 11, pp. 139-144, dated Nov. 2020.
Finn, Chelsea et al., "A Connection Between Generative Adversarial Networks, Inverse Reinforcement Learning, and Energy-Based Models," arXiv preprint arXiv:1611.03852, dated Nov. 25, 2016.
Peng, Xue Bin et al., "AMP: Adversarial Motion Priors For Stylized Physics-Based Character Control," ACM Transactions on Graphics, vol. 40, No. 4, pp. 1-20, dated Apr. 5, 2021.
Sestini, Alessandro et al., "Policy Fusion For Adaptive And Customizable Reinforcement Learning Agents," in 2021 Conference on Games (CoG). IEEE, pp. 01-08 dated Apr. 21, 2021.
Mao, Xudong et al., "Least Squares Generative Adversarial Networks," in International Conference on Computer Vision (ICCV), dated Apr. 5, 2017.
Schulman, John et al., "Proximal Policy Optimization Algorithms," arXiv preprint arXiv:1707.06347, dated Aug. 28, 2017.
Xu, Pei et al., "A Gan-Like Approach for Physics-Based Imitation Learning and Interactive Character Control," ACM on Computer Graphics and Interactive Techniques, vol. 4, No. 3, pp. 1-22, dated Dec 31, 2021.
Choi, Jinyoung et al.: Generative Adversarial Networks With Multiple Specialized Discriminators, arXiv preprint arXiv:2107.07260, dated Dec 13, 2021.
Schaefer, Christopher et al., "Crushinator: A Framework Towards Game-Independent Testing," in International Conference on Automated Software Engineering (ASE), dated 2013.
Vinyals, et al., Grandmaster Level in StarCraft II Using Multi-Agent Reinforcement Learning, https://doi.org/10.1038/s41586-019-1724-z, vol. 575, 22 pages, dated Oct. 30, 2019.
Ferguson, Mark, et al., Imitating Playstyle with Dynamic Time Warping Imitation, https://doi.org/10.1145/3555858.3555878, 11 pages, dated Sep. 5, 2022.

* cited by examiner

GENERATING PERSONAS WITH MULTI-MODAL ADVERSARIAL IMITATION LEARNING

TECHNICAL FIELD

This specification described systems, methods, and apparatus for policy models for selecting an action in a game environment based on persona data, as well as the use of said models.

BACKGROUND

In the video game industry, playtesting is an important method of quality control. The overall player experience can significantly suffer due to the presence of gameplay issues, such as bugs and glitches, thus it is necessary to reduce them as much as possible. Tests are mainly performed manually by humans who are tasked with playing games, or parts of games, and finding for gameplay issues, as well as evaluating if the game is enjoyable and sufficiently challenging. Manual playtesting is a powerful tool, but it is both expensive and time-consuming, especially for large and intricate games.

SUMMARY

According to a first aspect of this specification, there is described a computer implemented method of training a policy model to select actions for an agent in an environment. The method comprises: generating, using a policy model, a plurality of episodes of data, each episode of data a sequence of state-action pairs, wherein the action of each environment state-action pair is selected based on processing, by the policy model, an environment state of the state-action pair and an auxiliary input indicating a target action style; generating, for each of a plurality of the state-action pairs, a plurality of style scores using a plurality of discriminator models, wherein each discriminator model corresponds to a respective set of style demonstrations in a plurality of sets of style demonstrations, and wherein each style score for a state-action pair indicates a similarity between a respective set of style demonstrations and said state-action pair; determining a goal reward based on the one or more episodes of data and an environment goal; determining a style reward based on the plurality of style scores and the auxiliary input; updating parameters of the policy model based on the goal reward and the style reward; and updating parameters of the plurality of discriminator models based on the plurality of style scores.

The first aspect may further include one or more of the following features, either alone or in combination.

Generating the one or more episodes of data may comprise, for a plurality of timesteps in a sequence of timesteps: inputting, into the policy model, input data comprising a current environment state and the auxiliary input; processing, by the machine-learned policy model and based on current values of parameters of the policy model, the input data to select an action for a current timestep; performing, by the agent in the environment, the selected action; and determining, subsequent to the selected action being performed, an environment state for the next timestep. The state-action pair for the timestep may comprise the current environment state and the selected action.

Generating, for the plurality of the state-action pairs, the plurality of style scores using the plurality of discriminator models may comprise, for each discriminator model: inputting the state-action pair into the discriminator model; processing, by the discriminator model and based on current values of parameters of the discriminator model, the state-action pair; and outputting, from the discriminator model, a score indicative of a similarity between the state-action pair and a set of style demonstrations corresponding to the discriminator model.

The auxiliary input may comprise an n-dimensional vector, where n is the number of styles in a plurality of sets of style demonstrations. The style reward may comprise a weighted sum of style scores. The weight for each style score may be a corresponding component of the auxiliary input. The style reward, $r^S$, may be given by $$r^s(s_t, a_t) = \sum_{i=1}^{n} \alpha_i \max\left[0, 1 - 0.25(D_i(s_t, a_t) - 1)^2\right]$$

where $(s_t, a_t)$ is a state action pair, Di is the out of the i-th discriminator model, and $\alpha_i$ is the i-th component of the auxiliary input.

Updating parameters of the plurality of discriminator models based on the plurality of style scores may be based on a Least-Square GAN loss function with a gradient penalty term.

Each environment state may comprise a semantic map of the environment around the agent, a state of the agent, and/or a list of entities in the environment.

The policy model and/or the plurality of discriminator model comprises one or more fully connected neural network layers, one or more convolutional layers, one or more transformer layers and/or one or more embedding layers.

The environment may be a computer game environment or a simulated environment. The agent may be a player character or a non-player character in the game environment. The environment may be a real-world environment. The agent may be a robotic agent operating in a real-world or simulated environment.

According to a second aspect of this specification, there is described a computer implemented method of controlling an agent in an environment, the method comprising: for a plurality of timesteps in a sequence of timesteps: inputting, into a machine-learned policy model, input data comprising a current state of the environment and an auxiliary input, the auxiliary input indicating a target action style for the agent; processing, by the machine-learned policy model, the input data to select an action for a current timestep; performing, by the agent in the environment, the selected action; and determining, subsequent to the selected action being performed, an update to the current state of the environment.

According to a third aspect of this specification, there is described a system comprising one or more processors and a memory, the memory storing computer readable instructions that, when executed by the one or more processors, cause the system to perform operations comprising: for a plurality of timesteps in a sequence of timesteps: inputting, into a machine-learned policy model, input data comprising a current state of the environment and an auxiliary input, the auxiliary input indicating a target action style for the agent; processing, by the machine-learned policy model, the input data to select an action for a current timestep; performing, by the agent in the environment, the selected action; and determining, subsequent to the selected action being performed, an update to the current state of the environment.

The second and/or third aspects of this specification may further comprise one or more of the following features, wither alone or in combination.

The auxiliary input my comprise an n-dimensional vector, where n is a number of styles that the policy model has been trained on. The auxiliary input may indicate that the target action style is a blend of two or more of the n styles that the policy model has been trained on.

Processing the input data to select an action for a current timestep may comprise: determining, by the machine-learned policy model, a probability distribution over a plurality of actions based on the input data; and sampling an action from the probability distribution.

Each environment state may comprise a semantic map of the environment around the agent, a state of the agent, and/or a list of entities in the environment.

The environment may be a computer game environment or a simulated environment. The agent may be a player character or a non-player character in the game environment. The environment may be a real-world environment. The agent may be a robotic agent operating in a real-world or simulated environment.

The machine-learned policy model may comprise one or more fully connected neural network layers, one or more convolutional layers, one or more transformer layers and/or one or more embedding layers.

BRIEF DESCRIPTION OF THE DRAWINGS

Example embodiments will now be described by way of non-limiting example, with reference to the accompanying drawings, in which.

DETAILED DESCRIPTION

It is of great interest for game designers to be able to model playstyles (also referred to herein as a "persona") used during gameplay. By incorporating different personas in playtesting, game designers can better test how players can interact with one or more aspects of a game.

This specification describes systems, methods and apparatus that utilize a novel imitation learning algorithm able to create autonomous agents exhibiting different playstyles without the use of manual reward engineering. A single model can mimic the policy of several different persona demonstrations (i.e. the model is multimodal), and can switch and blend playstyles by conditioning the policy with an auxiliary input parameter. Game creators can easily and intuitively configure agents for automated playtesting and/or for game AI by sampling the behavior space induced by the demonstration.

While the systems, methods and apparatus described herein are described in the context of a computer game environment, it will be appreciated that other environments may alternatively be used without departing from the spirit of this disclosure. For example, the systems and methods used herein may be used to control a robotic agent to perform actions with different behavior styles.

Figure 1:
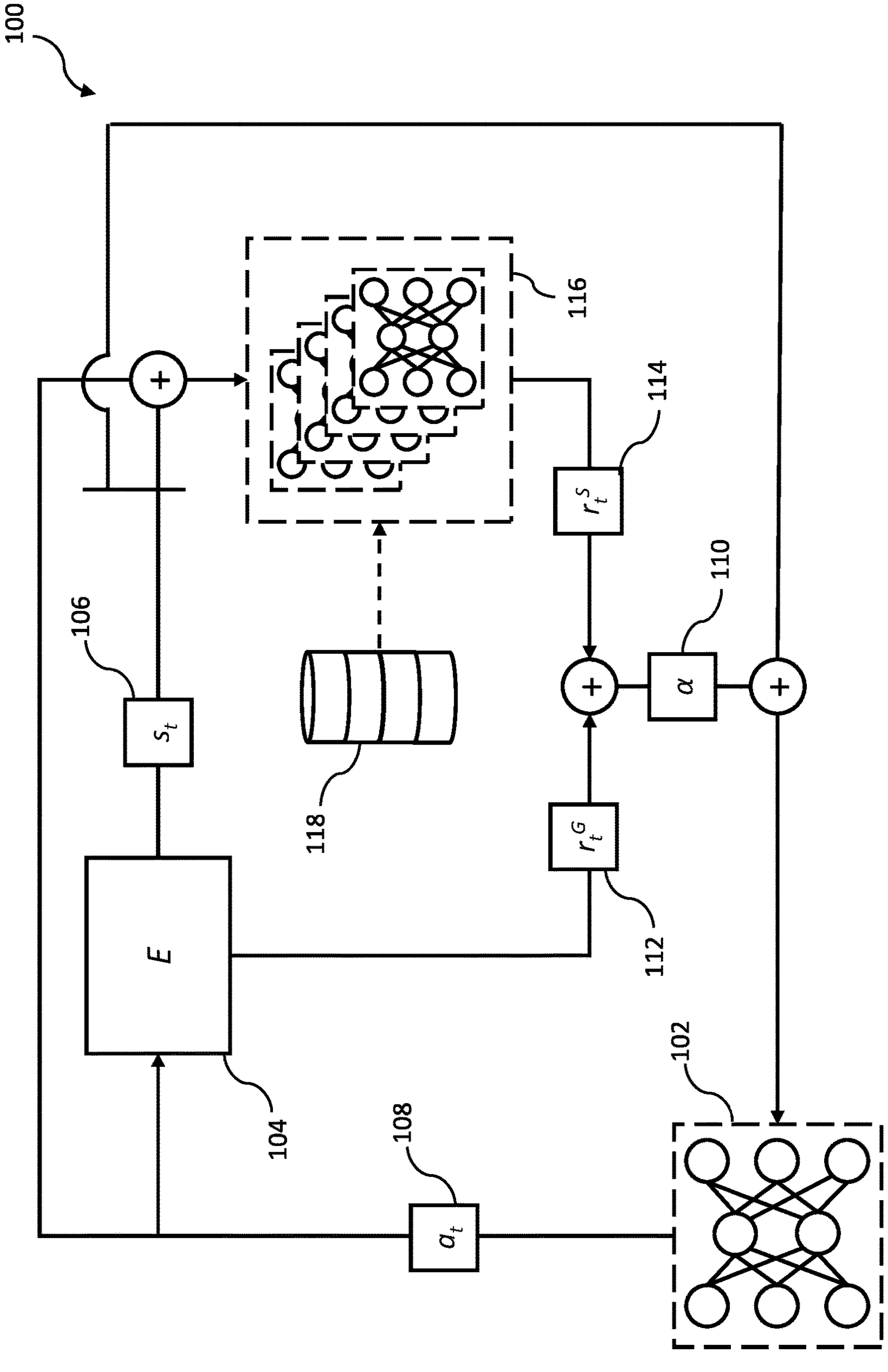
FIG. 1 shows an overview of an example method for selecting, by a machine-learned policy model, actions for an agent in a game environment conditioned on persona data.

FIG. 1 shows an overview of an example method 100 for training a policy model 102 (also referred to as an "action selection model"), π(a|s), for selecting actions for an agent in an environment conditioned on persona data. Given a set of n demonstrations $$118, M = \{M_i\}_{i=1}^{n},$$

with each element representing a distinct playstyle (e.g. "aggressive" or "stealthy"), the aim of the method 100 is to train a single policy model π(a|s) capable so of executing, switching and/or interpolation between playstyles. Each $M_i$ is a recording of demonstrations in the form:

$$M_i = \left(s_1^i, a_1^i, s_2^i, a_2^i, \ldots s_T^i\right)$$

where $s_t^i$ is an environment state and $a_t^i$ is an action performed by a player in the style i.

During training, the policy model 102, π(a|s), and environment 104 are used to generate a sequence of state-action pairs $(s_t, a_t)$, where $s_t$ is a current environment state 106 at time-step t, and $a_t$ is the action 108 selected by the policy model 102 at time-step t based on the current environment state 106. At each timestep, the current state of the environment 106 is input into the policy model 102 along with an auxiliary variable 110, α, that indicates a target action style. The auxiliary input $\overline{\alpha} \in \mathbb{R}^n$ is a vector of values of the same size as the number of personas in M. The current environment state 106 includes, in some examples, a goal, g, for the action sequence. Alternatively, the goal may be input into the policy model 102 separately. The policy mode processes the current environment state 106 and the auxiliary variable 110 (and the goal, if present) to generate an action 108 for the timestep. An agent in the environment 104 performs the selected action 108 to update the environment state 106 to the state at the next timestep, $s_{t+1}$. The sequence of state-action pairs, as well as a final environment state, $s_N$, obtained by performing the final selected action, $a_{N-1}$, may be combined to form an "experience", which may be stored in a replay buffer.

For each timestep of an experience, a corresponding reward is determined. The reward comprises a task-reward 112, $r^G$, and a style-reward 114, $r^S$. The task-reward specifies higher-level objectives of the environment, and encodes what the agent should accomplish, e.g. reach the goal or defeat all the enemies. The style-reward represents task-agnostic lower-level details of the agent's behavior when solving an objective, such as the agent's playstyle, e.g. playing aggressively or passively. The total agent reward is, in some examples, a weighted linear combination of these two terms:

$$r(s_t, a_t, s_{t+1}) = w^G r^G(s_t, a_t, s_{t+1}, g) + w^S r^S(s_t, a_t)$$

where $w^G$ and $w^S$ are weight coefficients.

Typically, the task-reward 112 is straightforward to design manually. The task-reward 112 may, for example, correspond to a distance between a desired environment state and a current environment state, e.g. the distance between the agent and a target so location in the environment, or a distance between the current configuration of the agent and a target configuration of the agent. As an example, relative spatial information between the goal and agent position may be represented as $\mathbb{R}^2$ projections of the agent-to-goal vector onto the XY and XZ planes. Many other examples are possible, and will be familiar to the person skilled in the art. Style rewards 114 are challenging to construct manually, with such manually created style rewards often resulting in unexpected/undesired behavior. Instead of a manually designed style reward, the method 100 utilises adversarial training techniques to model the style rewards. A single style-reward is represented with a discriminator function, $D_i$, from a plurality of discriminator functions 116, which is trained to differentiate whether a given state-action pair came from the agent policy model 102 or an associated expert demonstration, $M_i$, from the plurality of expert demonstrations 118. Each discriminator 116 returns a score indicating the similarity between its associated demonstration data 118 and the input state-action pair, e.g. a probability that the state-action pair is exhibiting the same behavior as the demonstration. The agent policy model 102 may be thought of as a generator function and learns to mimic the expert demonstrations to generate state-action pairs to fool the discriminator and receive higher rewards.

The style reward 114 for a given state-action pair may be based on a weighed sum of a function of the style scores output by the discriminators 116, where the weights are components of the auxiliary variable 110. For example, the style reward for a state-action pair may be given by:

$$r^S(s_t, a_t) = \sum_{i=1}^{n} \alpha_i \max\left[0, 1 - 0.25(D_i(s_t, a_t) - 1)^2\right]$$

where $(s_t, a_t)$ is a state action pair, $D_i$ is the out of the i-th discriminator model, and $\alpha_i$ is the i-th component of the auxiliary input 110. In essence, the auxiliary input components are used to scale the style score for the style associated with said components. For example, with two styles, $M_1$ and $M_2$, if the components of the auxiliary input are $a_1=0$ and $a_2=1$, then the agent will get 0 reward for following $M_1$ and a reward for following $M_2$.

The process may be repeated a predetermined number of times to generate a batch comprising a plurality of experiences and their respective rewards for each timestep. In general, the experiences may have different numbers of timesteps.

Before each training episode, the components of the auxiliary variable are uniformly sampled from a predefined set of fractional values in [0, 1]. During training, the total agent rewards for the state action pairs are used to train the policy model 102, and the discriminator outputs are used to train the discriminator models 116. A Proximal Policy Optimization (PPO) may be used to train the policy model, for example as described in "Proximal policy optimization algorithms" (J. Schulman et al., arXiv:1707.06347), the contents of which are incorporated herein by reference.

The discriminator models 116 may be trained using a respective GAN objective function for each model, such as a Least-Square GAN (LSGAN) loss, with a gradient penalty to improve training stability. For example, the GAN objective function for discriminator $D_i$ may be given by:

$$L_i^{AMP} = \arg\min_{D_i} \mathbb{E}_{d^{M_{i}}(s,a)}\left[(D_i(s, a) - 1)^2\right] + \mathbb{E}_{d^{\pi}(s,a)}\left[(D_i(s, a) + 1)^2\right] + \frac{w^{gp}}{2}\left[\|\nabla_\phi D_i(\phi)\,|_{\phi=(\Phi(s),\Phi(a))}\|^2\right]$$

where $d^{M_i}(s, a)$ and $d^{\pi}(s, a)$ respectively denote the likelihood of observing a state-action pair from the expert datasets or agent policy. The last term is the gradient penalty, and is scaled by the hyperparameter $w^{9P}$. An optimization procedure, such as stochastic gradient descent, may be applied to these loss functions to train the discriminator models 116.

The training process may, in some examples, use the following algorithm:

Algorithm 1:

Require: $M = \{M_i\}_{i=1}^n$ (n playstyle demonstrations)

Figure 2:
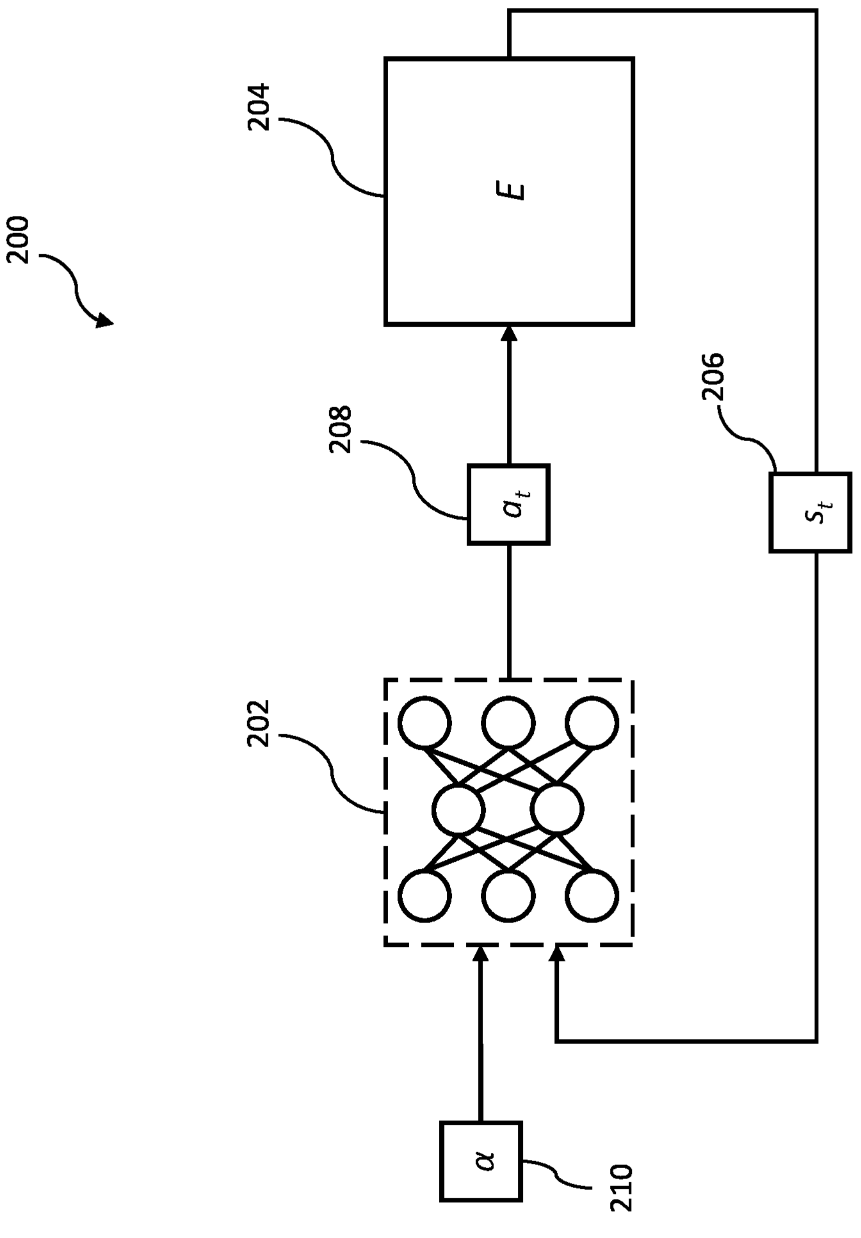
FIG. 2 show an overview of an example method for training a policy model for selecting so actions for an agent in a game environment conditioned on persona data.

$\pi \leftarrow$ initialize policy
V $\leftarrow$ initialize value function $\{D_i\}_{i=1}^n \leftarrow$ initialize n discriminators $\alpha \leftarrow$ initialize auxiliary inputs set
$\mathcal{B} \leftarrow$ initialize replay buffer
while not done do
  for trajectory i = 1, . . . , m do $\tau^i \leftarrow \left\{\left(s_t, a_t, r_t^G\right)_{t=1}^T, s_T^G, g\right\}$ Sample $\{a_i\}_{i=1}^n$ from $\alpha$ for time step t = 1, . . . , T do $\{r_i^t\}_{i=1}^n = \{D_i(s_t, a_t,)\}_{i=1}^n$ $r_t^S = \sum_{i=1}^n \alpha_i r_i^t$ $r_t = w^G r_t^G + w^S r_t^S$ store $r_t$ in $\tau_i$
   end for
   store $\tau_i$ in $\mathcal{B}$
  end for update $\{D_i\}_{i=1}^n$ with $\mathcal{L}^{AMP}$ with samples from $\mathcal{B}$ update update $\pi$ with $\mathcal{L}^{PPO}$ with samples from $\mathcal{B}$
end while FIG. 2 show an overview of an example method 200 for selecting, by a machine-learned policy model 202, actions for an agent in a game environment 204 conditioned on persona data 210. The machine-learned policy model 202 may have been trained using the method described in relation to FIG. 1. The method may be performed iteratively until a threshold condition is satisfied. The threshold condition may, for example, a goal, g, being reached by an agent in the game environment 204 and/or a target environment state, $s_g$. The threshold condition may alternatively or additionally be a threshold number of iterations. Alternatively, the method 200 may be iterated throughout gameplay in a computer game.

At each iteration, input data comprising a current state 206, $s_t$, of the game environment 204 and an auxiliary variable 210, α, is input into a machine-learned policy model 202. The machine-learned policy model 202 processes the input data to determine an action 208, $a_t$, for an agent in the environment 204. The agent (not shown) performs the action 208, and the environment state 206 is updated (i.e. $s_t \rightarrow s_{t+1}$).

The auxiliary variable 210 is used to control a playstyle (or persona) of the agent in the environment 202, i.e. the actions 208 selected by the policy network 202 are representative of actions that a human player with the playstyle would perform during gameplay. The auxiliary variable may be in the form of a n-dimensional vector, as described in relation to FIG. 1, where n is the number of distinct playstyles/personas that the policy model 202 was trained on. The auxiliary variable 210 may be varied between at least some of the iterations, i.e. the playstyle of the agent may be altered during gameplay.

The method 200 may be used to perform automated playtesting in a computer game. A player character is automatically controlled to perform actions selected by the policy model 202 with a playstyle indicated by the auxiliary variable. Alternatively or additionally, the method 200 may be used to control non-player characters (NPCs) characters during gameplay of a computer game.

Figure 3:
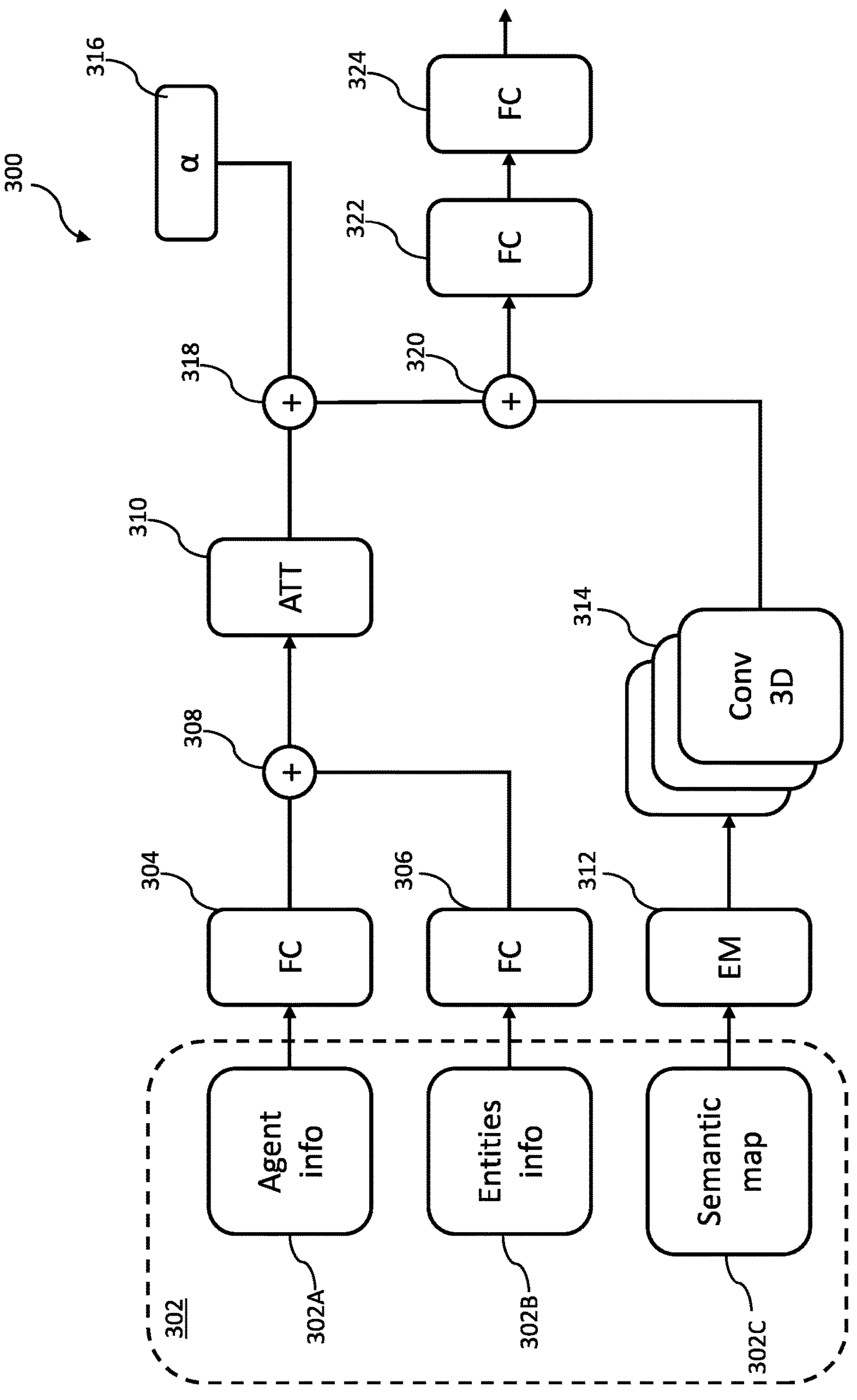
FIG. 3 shows an example of a network structure of a policy model and/or discriminator model.

FIG. 3 shows an example of a network structure 300 of a policy model and/or discriminator model. In some implementations, the same network structure is used for both the policy model and the discriminator models.

In example shown, the environment state 302 comprises agent information 302A, entities information 302B and a semantic map 302C of the environment (also referred to as a "semantic occupancy map"). The agent information 302A describes the agent under control by the policy model and the goal of the agent. The entities information 302B provides a list of entities in the environment and their respective properties. The sematic map 302C is used for local perception and describes the state of the environment around the agent, e.g. objects/entities present and their locations. In some examples, the sematic map 302C discretize the space surrounding the agent with voxels, e.g. an s x s x s cube of voxels centered on the agent. In some examples, s=5. Identities of elements which occupy a voxel may be categorically described as an integer value.

The agent information 302 may comprise a current state/configuration of the agent. For example, the agent state may specify the agent velocity, whether the agent is on the ground or flying or the like. In the example of a racing game, the agent state may comprise a velocity magnitude and xyz components, and an angular velocity in the driving plane. In the example of a navigation game, the agent state may include information of if the agent is climbing, has contact with the ground, is in an elevator, the jump cool down, and weapon magazine status.

The agent information 302A is input into a first network block 304, which processes it to determine a d-dimensional self-embedding, $x_a \in \mathbb{R}^d$, of the agent information 302A. In some examples, d is between 64 and 512, e.g. 128. The first network block 304 is, in some examples, a fully connected block. In some examples, the first network block 304 comprises a linear layer with shared weights.

The entity information 302B is input into a second network block 306, which processes it to determine a d-dimensional self-embedding, $x_{ei} \in \mathbb{R}^d$, for each entity in the entity information 302B. The second network block 306 is, in some examples, a fully connected block. In some examples, the second network block 306 comprises a linear layer with a ReLU activation. Each of the entity embeddings is concatenated with the self-embedding of the agent information 302A to generate a respective joint embedding, $x_{aei}=[x_a, x_{ei}]$, where $x_{aei} \in \mathbb{R}^{2d}$. The resulting list of vectors is passed through a transformer encoder 310 with, for example, 4 heads and final average pooling, producing a single joint embedding vector $x_t \in \mathbb{R}^{2d}$.

The semantic map 302C $M \in \mathbb{R}^{sxsxs}$ input into an embedding model 312 that transforms categorical representations into continuous ones. The embedding model 312 is, in some examples, a single layer of size 8 with a tanh activation. The resulting embedding is input into a 3D convolutional network 314, which outputs a feature embedding $x_M \in \mathbb{R}^d$. The 3D convolutional network 314 comprises, in some examples, three convolutional layers with 32, 64 and 128 filters respectively, a stride of two and leaky ReLU activation.

The feature embedding, $x_M$, is combined 318, 320 with the joint embedding, xt, and the auxiliary variable 316, a, to produce a combined embedding, $x_{MT}$. Combining 318, 320 the feature embedding, the joint embedding and the auxiliary variable may comprise concatenating the feature embedding, the joint embedding and the auxiliary variable.

The combined embedding is then passed through one or more neural network layers 322, 324 to produce the network output. For a policy model, the network output may be a probability distribution over a set of potential actions, from which a selected action (e.g. the action to be used by the agent) is sampled. In some examples, for a policy model the one or more neural network layers 322, 324 comprise one linear layer, e.g. of size 256, with a ReLU activation, and one final layer producing the action probability distribution For a discriminator, the network output is a probability that the input environment state and action pair are taken from the set of examples associated with said discriminator. In some examples, for a discriminator, the one or more neural network layers 322, 324 comprise two linear layers, e.g. of size 256, with leaky ReLU activation. The last layer may a linear layer with sigmoid activation representing the discriminator probability.

Figure 4:
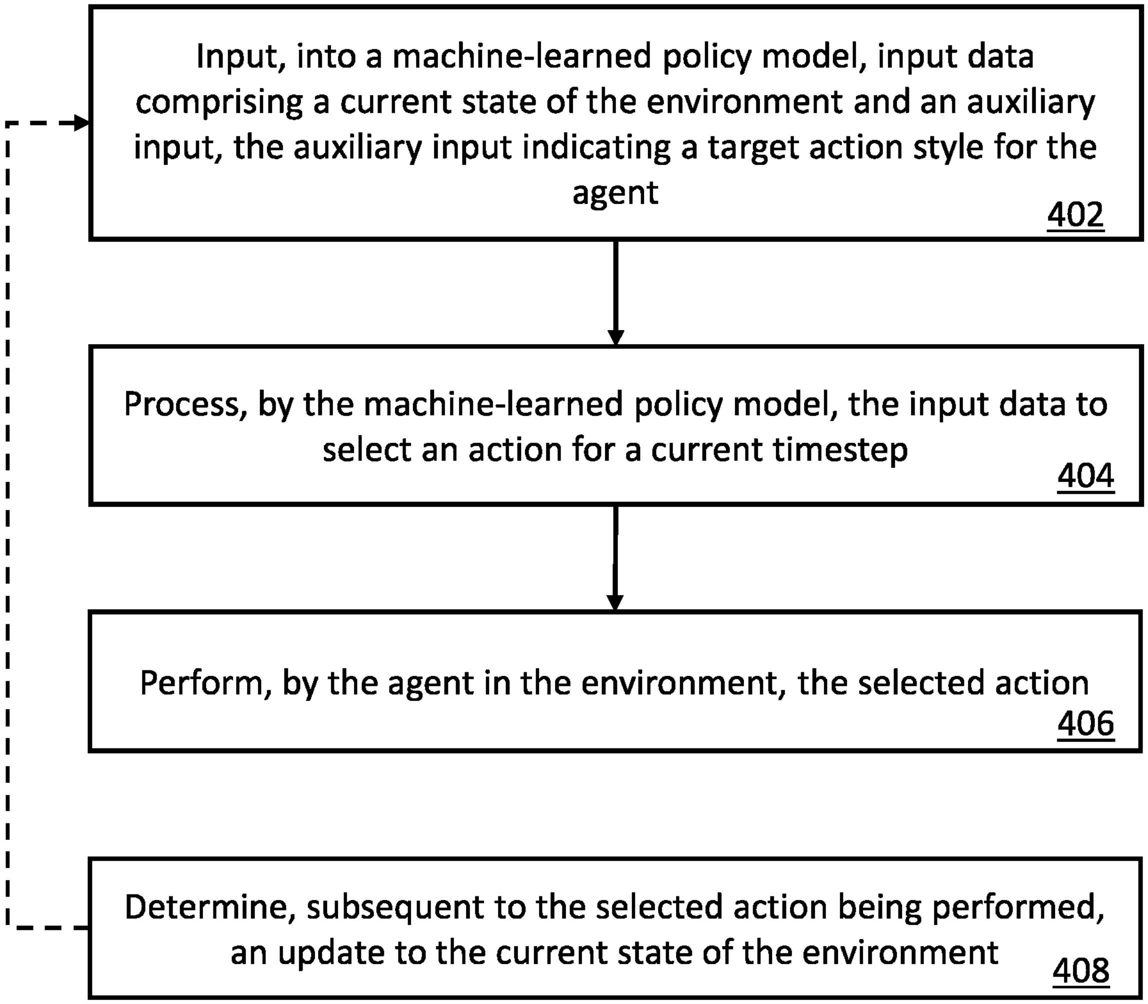
FIG. 4 shows a flow diagram of an example method for selecting, by a machine-learned policy model, actions for an agent in a game environment conditioned on persona data.

FIG. 4 shows a flow diagram of an example method for selecting, by a machine-learned policy model, actions for an agent in a game environment conditioned on persona data. The method may be performed by a computer system, such as the system described in relation to FIG. 6. The method may be iterated for a plurality of timesteps, e.g., until a threshold condition is satisfied. The method may correspond to the method described in relation to FIG. 2.

At operation 402, input data is input into a machine-learned policy model. The input data comprises a current state of an environment, e.g., a game environment, and an auxiliary variable indicating a target action style for an agent in the environment, e.g., a player character or a non-player character.

The auxiliary input may comprise an n-dimensional vector, where n is a number of styles that the policy model has been trained on. The components of the auxiliary input may take user defined values in the range [0, 1]. The auxiliary input may indicate that the target action style is a blend of two or more of the n styles that the policy model has been trained on.

The environment state may comprise a semantic map of the environment around the agent, a state of the agent, and/or a list of entities in the environment. An agent/environment goal may be provided as part of the environment state, for example so as part of the agent state or environment state.

The machine-learned policy model may be a neural network. The machine-learned policy model may comprise one or more fully connected neural network layers, one or more convolutional layers, one or more transformer layers and/or one or more embedding layers, for example as described in relation to FIG. 3. The machine-learned policy model may have been trained using any of the training methods described herein.

At operation 404, the machine-learned policy model processes the input data to select an action for a current timestep. The output from the machine-learned policy model comprises, in some examples, a probability distribution over a set of agent actions, from which the selected action is sampled. The probability distribution may be sampled in a greedy manner, i.e. the action with the highest probability is taken. Alternatively, the probability distribution may be sampled using probabilistic methods, e.g., the sampling is non-deterministic.

At operation 406, the agent performs the selected action, or is caused to perform the selected action. The selected action may be converted into one or more commands for controlling the agent. The commands may be input to an agent controller in order to cause the agent to perform the selected action in the environment.

At operation 408, an update to the current state of the environment is determined subsequent to the agent performing the action. For example, an updated agent state, semantic map of the environment and/or list of entities in the environment may be determined once the agent has performed, or is performing, the action.

The method then returns to operation 402 to determine the next action for the agent.

Figure 5:
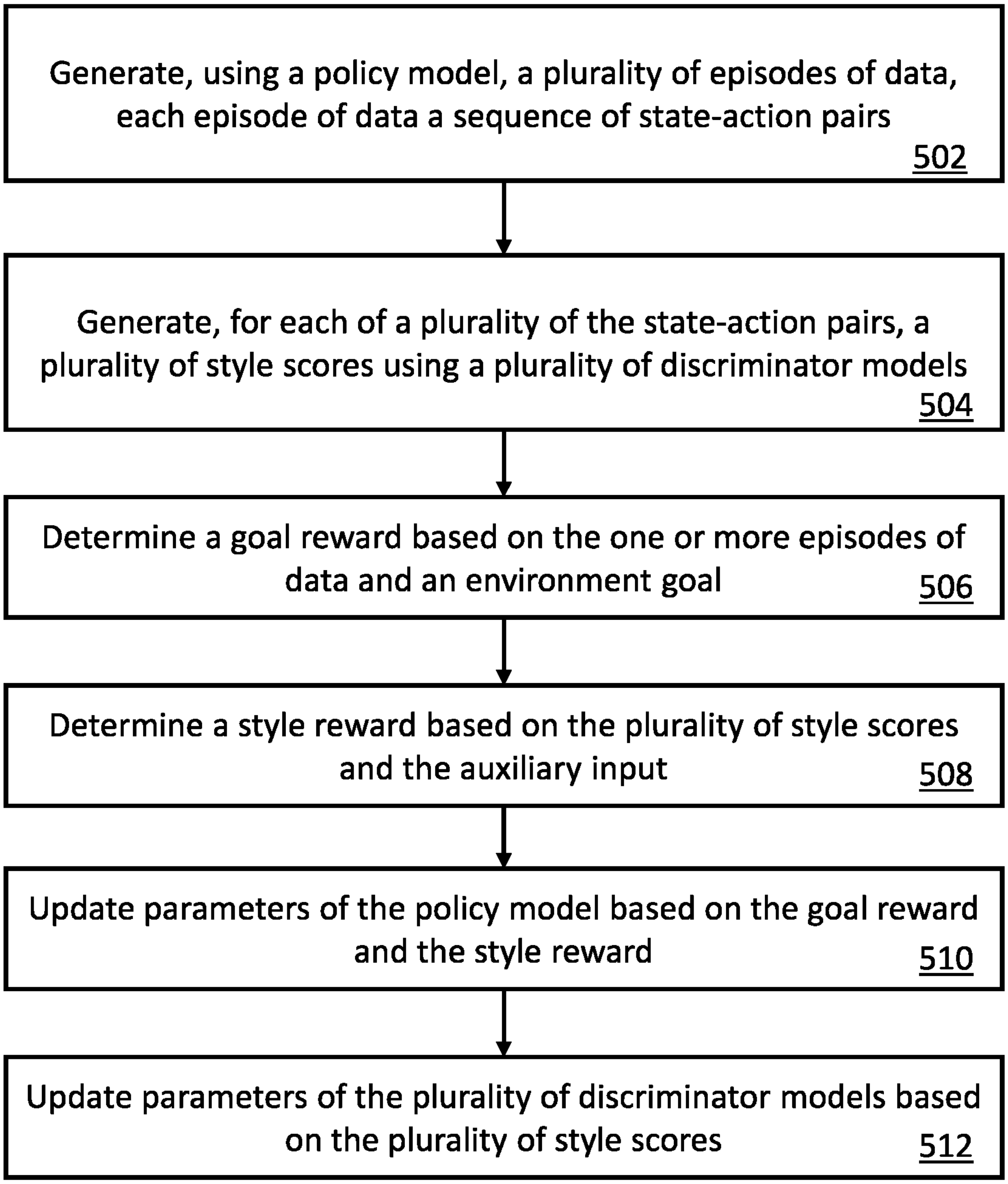
FIG. 5 shows a flow diagram of an example method for training a policy model for selecting actions for an agent in a game environment conditioned on persona data.

FIG. 5 shows a flow diagram of an example method for training a policy model for selecting actions for an agent in an environment conditioned on persona data. The environment may be a game environment. The method corresponds to the method described in relation to FIG. 2. The method may be performed by a computing system, such as the method described in relation to FIG. 6.

At operation 502, a plurality of episodes of behavioral data are generated using a policy model. Each episode of data comprises a sequence of state-action pairs, wherein the action of the pair is selected using the policy model based on the state of the pair and an auxiliary input indicating a target action style.

Generating an episode of behavioral data may comprise, at each of a plurality of timesteps, selecting an action for a current timestep based on the current environment state and the auxiliary input, causing the agent to perform the selected action in the environment, and determining an updated environment state after the action has been performed, e.g. the environment state for the next timestep. Selecting an action for the current timestep may comprise inputting the current environment state and auxiliary input into the policy model and processing the current environment state and auxiliary input based on current values of parameters of the policy model. The output of the policy model may be a probability distribution over a set of agent actions, from which the selected action is sampled. The state-action pair for the timestep comprises the current environment state and the selected action.

The auxiliary variable may be a n-dimensional vector, where n is the number of (distinct) styles in a plurality of sets of style demonstrations. Components of the n-dimensional vector may take continuous values. At each training episode, components of the auxiliary variable may be sampled from fractional values in the range [0,1].

The environment state may comprise a semantic map of the environment around the agent, a list of one or more entities in the environment and/or an agent state/configuration. The environment state may comprise an environment goal, for example as part of the agent state.

The policy model may comprise one or more fully connected neural network layers, one or more convolutional layers, one or more transformer layers and/or one or more embedding layers, for example as described in relation to FIG. 3.

At operation 504, for each state-action pair, a plurality of style scores are generated using a respective plurality of discriminator models. Each discriminator model corresponds to a respective set of style demonstrations (e.g. behaviour indicative of certain behavior style) in a plurality of sets of style demonstrations. Each style score for a state-action pair indicates a similarity between a respective set of style demonstrations and said state-action pair.

Each state-action pair is input into a plurality of discriminator models. Each discriminator model processes the state-action pair in accordance with current values of parameters (e.g. weights and/or biases) of the discriminator model to determine a score indicative of a similarity between the state-action pair and a set of style demonstrations corresponding to the discriminator model (e.g. based on a probability that the state-action pair was taken from a demonstration corresponding to the discriminator model).

Each discriminator model may comprise one or more fully connected neural network layers, one or more convolutional layers, one or more transformer layers and/or one or more embedding layers, for example, as described in relation to FIG. 3. In some examples, the discriminator models all have the same structure.

At operation 506, a goal reward is determined based on the episodes of data and an environment goal. The goal reward may be any appropriate goal reward used in reinforcement learning.

At operation 508, a style reward is determined based on the plurality of style scores and the auxiliary input. A weighted sum of the style scores may be taken to determine the style reward. The weights of the weighted sum may be respective values of the auxiliary input. For example, for n sets of demonstrations, there will be n corresponding discriminators and n components of the auxiliary variable, each component corresponding to a set of demonstrations. The style reward may be based on a sum of the products of each discriminator model with its corresponding auxiliary input component.

As an example, the style reward may be given by:

$$r^S(s_t, a_t) = \sum_{i=1}^{n} \alpha_i \max\left[0, 1 - 0.25(D_i(s_t, a_t) - 1)^2\right]$$

where $(s_t, a_t)$ is a state action pair, $D_i$ is the out of the i-th discriminator model, and $\alpha_1$ is the i-th component of the auxiliary input.

At operation 510, parameters of the policy model are updated based on the goal reward and the style reward. An optimization procedure, such as proximal policy optimization, may be applied to the reward to determine the parameter updates.

At operation 512, parameters of the plurality of discriminator models are updated based on the plurality of style scores. An optimization procedure, such as stochastic gradient descent, may be applied to a loss function that is based on the plurality of style scores. The objective function may be a least-squares GAN loss function. In some examples, the objective function includes a gradient penalty term.

Updates to the parameters of the policy model (i.e., operation 510) and the plurality of discriminator models (i.e., operation 512) can occur at different rates/in different rations. For example, multiple iterations of policy model updates may be performed for each iteration of discriminator model updates, e.g., three iterations of policy model updates for each iteration of discriminator model updates.

Figure 6:
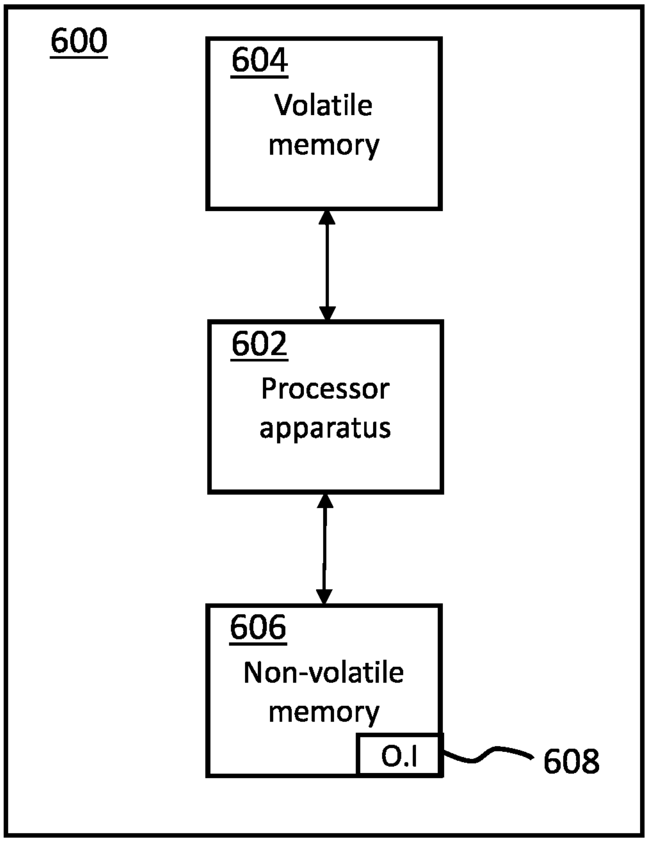
FIG. 6 shows an overview of an example computing system.

FIG. 6 shows a schematic overview of a computing system 600 for performing any of methods described herein. The system/apparatus shown is an example of a computing device. It will be appreciated by the skilled person that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general purpose processor. The one or more processors 602 may be a single core device or a multiple core device. The one or more processors 602 may comprise a central processing unit (CPU) or a graphical processing unit (GPU). Alternatively, the one or more processors 602 may comprise specialized processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to temporarily store data generated during execution of said operating instructions 608.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 8, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or so used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer implemented method of training a policy model to select actions for an agent in an environment, the method comprising:

generating, using a policy model, a plurality of episodes of data, each episode of data a sequence of state-action pairs, wherein the action of each environment state-action pair is selected based on processing, by the policy model, an environment state of the state-action pair and an auxiliary input indicating a target action style;

generating, for each of a plurality of the state-action pairs, a plurality of style scores using a plurality of discriminator models, wherein each discriminator model corresponds to a respective set of style demonstrations in a plurality of sets of style demonstrations, and wherein each style score for a state-action pair indicates a similarity between a respective set of style demonstrations and said state-action pair;

determining a goal reward based on the one or more episodes of data and an environment goal;

determining a style reward based on the plurality of style scores and the auxiliary input;

updating parameters of the policy model based on the goal reward and the style reward; and updating parameters of the plurality of discriminator models based on the plurality of style scores.

2. The method of claim 1, wherein generating the one or more episodes of data comprises, for a plurality of timesteps in a sequence of timesteps:

inputting, into the policy model, input data comprising a current environment state and the auxiliary input;

processing, by the policy model and based on current values of parameters of the policy model, the input data to select an action for a current timestep, performing, by the agent in the environment, the selected action; and determining, subsequent to the selected action being performed, an environment state for the next timestep, wherein the state-action pair for the timestep comprises the current environment state and the selected action.

3. The method of claim 1, wherein generating, for the plurality of the state-action pairs, the plurality of style scores using the plurality of discriminator models comprises, for each discriminator model:

inputting the state-action pair into the discriminator model;

processing, by the discriminator model and based on current values of parameters of the discriminator model, the state-action pair; and outputting, from the discriminator model, a score indicative of a similarity between the state-action pair and a set of style demonstrations corresponding to the discriminator model.

4. The method of claim 1, wherein the auxiliary input comprises an n-dimensional vector, where n is the number of styles in a plurality of sets of style demonstrations.

5. The method of claim 4, wherein the style reward comprises a weighted sum of style scores, wherein the weight for each style score is a corresponding component of the auxiliary input.

6. The method of claim 5, wherein the style reward, $r^s$, is given by $$r^S(s_t, a_t) = \sum_{i=1}^{n} \alpha_i \max\left[0, 1 - 0.25(D_i(s_t, a_t) - 1)^2\right]$$

where $(S_t, a_t)$ is a state action pair, Di is the out of the i-th discriminator model, and $a_i$ is the i-th component of the auxiliary input.

7. The method of claim 1, wherein updating parameters of the plurality of discriminator models based on the plurality of style scores is based on a Least-Square GAN loss function with a gradient penalty term.

8. The method of claim 1, wherein each environment state comprises a semantic map of the environment around the agent, a state of the agent, and/or a list of entities in the environment.

9. The method of claim 1, wherein the policy model and/or the plurality of discriminator model comprises one or more fully connected neural network layers, one or more convolutional layers, one or more transformer layers and/or one or more embedding layers.

10. The method of claim 1, wherein the environment is a computer game environment.

11. A system comprising one or more processors and a memory, the memory storing computer-readable instructions that, when executed by the one or more processors, cause the system to perform operations comprising:

generating, using a policy model, a plurality of episodes of data, each episode of data a sequence of state-action pairs, wherein the action of each environment state-action pair is selected based on processing, by the policy model, an environment state of the state-action pair and an auxiliary input indicating a target action style;

generating, for each of a plurality of the state-action pairs, a plurality of style scores using a plurality of discriminator models, wherein each discriminator model corresponds to a respective set of style demonstrations in a plurality of sets of style demonstrations, and wherein each style score for a state-action pair indicates a similarity between a respective set of style demonstrations and said state-action pair;

determining a goal reward based on the one or more episodes of data and an environment goal;

determining a style reward based on the plurality of style scores and the auxiliary input;

updating parameters of the policy model based on the goal reward and the style reward; and updating parameters of the plurality of discriminator models based on the plurality of style scores.

12. The system of claim 11, wherein generating the one or more episodes of data comprises, for a plurality of timesteps in a sequence of timesteps:

inputting, into the policy model, input data comprising a current environment state and the auxiliary input;

processing, by the policy model and based on current values of parameters of the policy model, the input data to select an action for a current timestep, performing, by the agent in the environment, the selected action; and determining, subsequent to the selected action being performed, an environment state for the next timestep, wherein the state-action pair for the timestep comprises the current environment state and the selected action.

13. The system of claim 11, wherein generating, for the plurality of the state-action pairs, the plurality of style scores using the plurality of discriminator models comprises, for each discriminator model:

inputting the state-action pair into the discriminator model;

processing, by the discriminator model and based on current values of parameters of the discriminator model, the state-action pair; and outputting, from the discriminator model, a score indicative of a similarity between the state-action pair and a set of style demonstrations corresponding to the discriminator model.

14. The system of claim 11, wherein the auxiliary input comprises an n-dimensional vector, where n is the number of styles in a plurality of sets of style demonstrations.

15. The system of claim 14, wherein the style reward comprises a weighted sum of style scores, wherein the weight for each style score is a corresponding component of the auxiliary input.

16. A non-transitory computer-readable medium storing computer-readable instructions that, when executed by a computer, cause the computer to perform operations comprising:

generating, using a policy model, a plurality of episodes of data, each episode of data a sequence of state-action pairs, wherein the action of each environment state-action pair is selected based on processing, by the policy model, an environment state of the state-action pair and an auxiliary input indicating a target action style;

generating, for each of a plurality of the state-action pairs, a plurality of style scores using a plurality of discriminator models, wherein each discriminator model corresponds to a respective set of style demonstrations in a plurality of sets of style demonstrations, and wherein each style score for a state-action pair indicates a similarity between a respective set of style demonstrations and said state-action pair;

determining a goal reward based on the one or more episodes of data and an environment goal;

determining a style reward based on the plurality of style scores and the auxiliary input;

updating parameters of the policy model based on the goal reward and the style reward; and updating parameters of the plurality of discriminator models based on the plurality of style scores.

17. The non-transitory computer-readable medium of claim 16, wherein generating the one or more episodes of data comprises, for a plurality of timesteps in a sequence of timesteps:

inputting, into the policy model, input data comprising a current environment state and the auxiliary input;

processing, by the policy model and based on current values of parameters of the policy model, the input data to select an action for a current timestep, performing, by the agent in the environment, the selected action; and determining, subsequent to the selected action being performed, an environment state for the next timestep, wherein the state-action pair for the timestep comprises the current environment state and the selected action.

18. The non-transitory computer-readable medium of claim 16, wherein generating, for the plurality of the state-action pairs, the plurality of style scores using the plurality of discriminator models comprises, for each discriminator model:

inputting the state-action pair into the discriminator model;

processing, by the discriminator model and based on current values of parameters of the discriminator model, the state-action pair; and outputting, from the discriminator model, a score indicative of a similarity between the state-action pair and a set of style demonstrations corresponding to the discriminator model.

19. The non-transitory computer-readable medium of claim 16, wherein the auxiliary input comprises an n-dimensional vector, where n is the number of styles in a plurality of sets of style demonstrations.

20. The non-transitory computer-readable medium of claim 19, wherein the style reward comprises a weighted sum of style scores, wherein the weight for each style score is a corresponding component of the auxiliary input.

* * * * *